Figure 8:
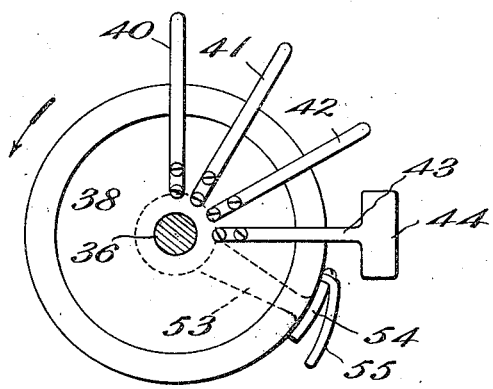

E. R. GILL.
ART OF UTILIZING HERTZIAN WAVES.
APPLICATION FILED JAN. 29, 1914.
1,201,034.
Patented Oct. 10, 1916.
3 SHEETS—SHEET 1.
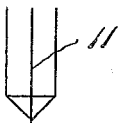
Fig. 1.
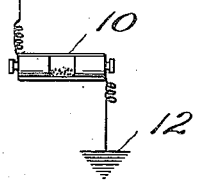
Fig. 2.
Fig. 3.
Fig. 4.
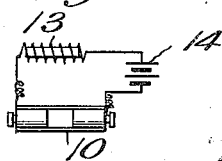
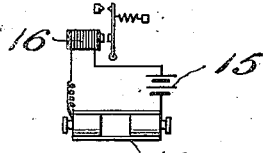
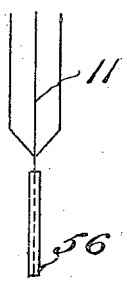
Fig. 5.
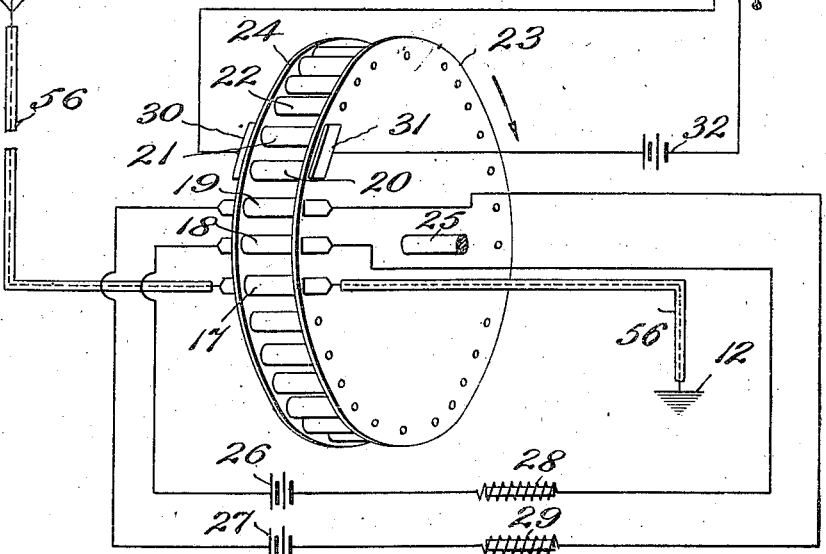
Witnesses:
Katharine C Mead
Geo H Pease
Edwin R. Gill Inventor
By his Attorneys
Wilkinson, Giusta and MacKaye E. R. GILL.
ART OF UTILIZING HERTZIAN WAVES.
APPLICATION FILED JAN. 29, 1914.
1,201,034.
Patented Oct. 10, 1916.
3 SHEETS—SHEET 2.
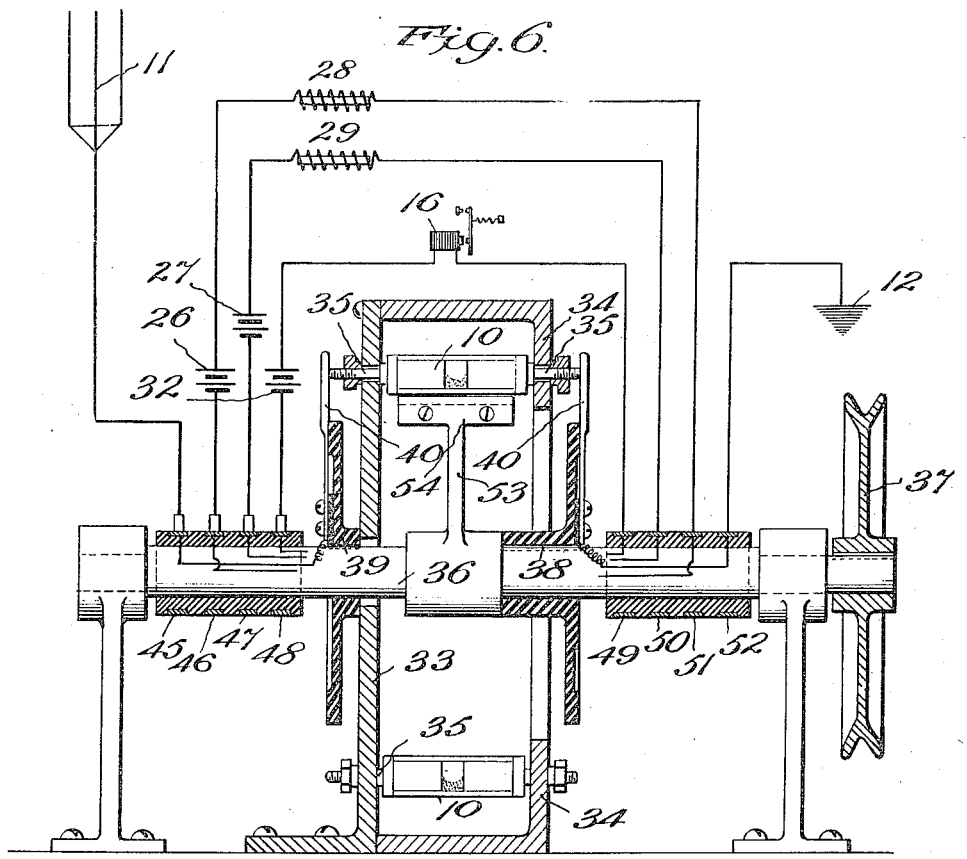
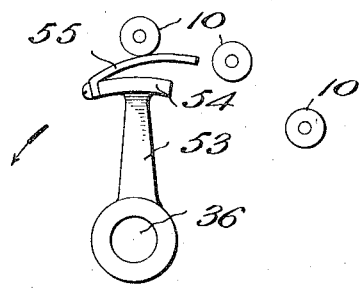
Witnesses:
Katharine C. Mead
Geo. H. Byrne.
Edwin R. Gill
Inventor
By his Attorneys
Wilkinson, Fiasta and Mackaye

E. R. GILL.
ART OF UTILIZING HERTZIAN WAVES.
APPLICATION FILED JAN. 29, 1914.

1,201,034.
Patented Oct. 10, 1916.
3 SHEETS—SHEET 3.

Witnesses:
Katharine C. Mead
Jas. A. Byrne.

Edwin R. Gill
Inventor
By his Attorneys
Wilkinson, Fiusta and MacKaye

UNITED STATES PATENT OFFICE.

EDWIN R. GILL, OF YONKERS, NEW YORK, ASSIGNOR TO THERON McCAMPBELL.

ART OF UTILIZING HERTZIAN WAVES.

1,201,034. Specification of Letters Patent. Patented Oct. 10, 1916.

Application filed January 29, 1914. Serial No. 815,186.

*To all whom it may concern:*

Be it known that I, EDWIN R. GILL, a citizen of the United States, residing at Yonkers, in the county of Westchester and State of New York, have invented certain new and useful Improvements in the Art of Utilizing Hertzian Waves; and I do hereby declare the following to be a full, clear, and exact description of the invention, such as will enable others skilled in the art to which it appertains to make and use the same.

In the present art of wireless telegraphy the preferred receiving or wave-detecting means are of a very delicate and often of an unreliable nature, producing records of a degree of faintness corresponding to the weakness of the wave which originates the effect. This important defect is supplemented by the further disadvantage that the receiving operator is obliged to give constant and nerve-taxing attention to the receiving instrument, often during many hours at a time. I have discovered means whereby both of these disadvantages may be obviated in a practical and simple manner.

It is the principal object of my present invention to provide a method and means for producing powerful and reliable records (audible or visible or both) from relatively weak originating aerial impulses; and to produce records of substantially uniform power in spite of variations in the power of the originating impulses. It follows from this that my invention relieves the receiving operator from the excessive strain upon brain and nerves which is imposed by use of the delicate detectors used in the manner common hitherto.

My invention is based upon the discovery that the originating aerial impulses or wave groups, of the kind commonly transmitted in the art of "wireless" telegraphy, produce an incipient condition or impression in detectors, which "impression" (although too faint to give any useful result in itself) is capable of being "developed," much as a picture is developed upon a negative after exposure to light. By first "impressing" this incipient condition upon a detector, and then "developing" this condition by suitable means to increase its efficiency, I am able reliably to operate rough, simple and powerful apparatus (for instance ordinary telegraphic relays and sounders) and to make such apparatus record successfully the receipt of relatively weak original impulses. It is obvious that relays may thus be used to operate or control semaphores, telegraphic selectors, electric chronographs, and, in short, any apparatus capable of operation by electricity. For the sake of brevity I herein use the terms "record," "recording," etc., to cover, not only delivering a message, but utilizing the developed state of the "impressed" detector in any manner and for any purpose.

While the invention relates to a process and apparatus employed in connection with any form of detector in which the incipient condition is capable of production and development, I have found the ordinary types of coherer to be particularly practicable in this connection, and the invention overcomes certain objections hitherto incident to these devices.

My present invention covers a method involving any mode of developing the incipient condition referred to, and it may be found that different types of detectors are differently impressed and are best "developed" by different means in each case. My preferred method of development, however, involves subjecting the "impressed" detector (preferably a coherer) to the action of electrical "surgings" of the kind produced by breaking an electric circuit (usually of high inductance) however such surgings may in fact be produced.

In connection with the use of coherers, I have discovered that the difficulties due to uncertain decoherence may be entirely removed if the decohering is carried on while the coherer is disconnected from the relay it is intended to affect, or is preferably on open circuit.

The application of my discovery to practice involves the use of a number of detectors, each in turn being put through a cycle of treatment and operation substantially as follows: First, connection in circuit with the antennæ or aerial receiver in any appropriate or usual manner. Second, application of the developing agency. (This may be repeated once or more). Third, connection in circuit with the relays or other recording devices. Fourth, restoration to a sensitive condition (where necessary) before being again subjected to the influence of the aerial receiver or antenna. It is clear that, if a number of detectors be employed in this manner at such a speed that one at least shall be sure to be affected by any wave to be received and recorded, however short;

and if these detectors be applied successively to the relay circuit (or its equivalent) in such a manner that one at least is always in such circuit; long and short records will be produced at the relay or equivalent receiver, corresponding to the long and short impulses or wave groups delivered to the antenna. Moreover, if the development be fully carried out, the strength of the actual record received will be practically uniform, in spite of considerable variations (within practical limits) of the aerial impulses.

The principles involved in my discovery and invention, as embodied in apparatus using coherers, and certain modifications of such apparatus, are illustrated by way of example in the accompanying drawings wherein—

Figure 9:
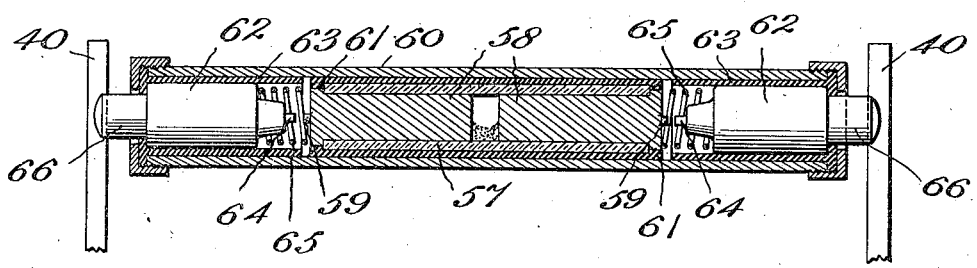

Figures 1 to 4 inclusive are diagrams showing successive circuit conditions to which the coherers are each subjected, Fig. 5 is a diagram of one form of apparatus for producing the changes called for by my invention, Fig. 6 is a sectional view of a modified form of apparatus for the same purpose, Fig. 7 is a side view of the decohering arm used in the device of Fig. 6, Fig. 8 is a side view showing the movable radial contact arms on the two sides of said device, and Fig. 9 shows one of many possible modifications of the coherer arrangement which may be adopted for more certainly protecting each coherer from being improperly "impressed" by sparks incidental to use of the apparatus. The simplest complete carrying out of my discovery is illustrated diagrammatically in Figs. 1 to 4. Here any appropriate coherer 10 is shown first connected in a well known manner to the receiving antenna 11 and to the ground 12. Appropriate "tuning" means are, of course understood, and need no illustration. This is the first step, whereby the detector 10 is "impressed" or prepared for development. Fig. 2 shows that the second step preferably involves disconnection of the detector from the antennæ and ground, and creation of a new circuit through said detector, which, on being broken, sets up a "surging" condition as well understood. For greater efficiency this circuit includes a high induction coil 13, as well as a generator 14, which may be a simple battery. The step shown in Fig. 2 may be, and preferably is repeated, in order to get more thorough action. I have discovered that this treatment, when applied to a detector impressed with the incipient condition above referred to, will develop full operativeness, and produce low resistance in a coherer, for instance; and this, even though the original undeveloped impression leaves the detector apparently unaffected so far as its ability to operate a relay, or other electric signaling means, is concerned. This incipient condition impressed upon the detector having been developed, the next step is to bring it into operative relation with the recording means. This is exemplified in connection with an ordinary relay in Fig. 3, wherein the generator is shown at 15 and a relay at 16. During this step the developed condition of the detector is utilized. This having been accomplished the detector must be returned to the antennæ circuit in a state of renewed sensitiveness, which may be termed its virgin condition. Where a coherer is employed, this may be accomplished by any means capable of "decohering," and this should be employed while the coherer is on open circuit, as shown in Fig. 4. This method of utilizing the impressed condition of a detector may be applied practically in a great variety of ways, and I have shown diagramatically two types of apparatus for this purpose in the drawings.

In the form indicated in Fig. 5, a series of coherers 17, 18, 19, 20, 21, 22, etc., is mounted between two parallel disks 23 and 24 in what is known as "squirrel-cage" or "mouse-mill" formation, so that they may be made to revolve around a shaft 25 in the direction indicated by the arrow. The conducting terminals at the ends of the coherers are exposed at the two sides of the apparatus, as shown on one side in Fig. 5, and are caused to make contact with suitably placed and constructed stationary contact terminals whereby the appropriate circuits are successively closed through each coherer in turn. In discussing the operation of this type of apparatus, the successive coherers 17 to 22 will be considered as indicating successive positions taken by a single coherer as they all revolve together.

In the position 17, the condition of Fig. 1 is reproduced, wherein the coherer is connected on one side with the antenna 11 and on the other side with the ground 12. In passing through the positions 18 and 19 two successive high induction circuits are closed and broken through generators 26, 27, and induction coils 28, 29, and through the coherer in each instance. The "surgings" incident to the breaking of these circuits produce the development of the incipient condition created at 17. The coherer then passes to 20, where is makes contact with two relatively broad contact pieces 30 and 31, thereby closing circuit through itself, the generator 32 and the relay 16. Since the coherer has been "developed" at 18 and 19, its resistance is now so low as to insure prompt, reliable and powerful operation of the relay. Just as the coherer is leaving the contacts 30 and 31, at 21, and is about to break the relay circuit, the next coherer is coming into contact at 20; and, therefore, if two or more coherers have been impressed and developed successively, the circuit through the relay 16 will be kept closed during the entire time of the passage of such successively impressed coherers over the contacts 30 and 31. It will thus be seen that the relative duration of the periods of energizing of the relay will correspond always to the relative durations of the "impressing" aerial impulses or wave groups. The utilization of relatively long and short impulses in any appropriate manner thus becomes practicable, and may be applied to all sorts of purposes.

I have found that, where a coherer of the ordinary type is placed on open circuit, it will be "decohered" with certainty by revolving it upon its own axis through a sufficient angle—preferably at least a half circle. It will be seen that this is the treatment to which each coherer is subjected after leaving the contacts 30 and 31. In the position 22, and all subsequent positions until, as it follows the circle, it again reaches the position 17, each coherer is in open circuit. At the same time it is being revolved upon its axis, so that, by the time it again reaches the position 17, in readiness to be impressed by a new wave group, the coherer has been brought with certainty to its "virgin" condition of extremely high resistance. Of course, if desired supplemental decohering means may be resorted to during travel of the coherer from the position 22 to 17, without departing from my invention.

It is obvious that the coherers may be brought into relation with the proper successive circuits for carrying out my invention by apparatus comprising movable contacts, while the coherers remain stationary, without departing from the invention, and I have indicated this form of apparatus in Figs. 6, 7 and 8.

The coherers 10 are supported in squirrel-cage formation by the framework 33, having a bearing flange 34, between which and the main portion of the frame the coherers are so mounted as to be capable of rotation on journals 35, which also serve to make contact with the revolving switch arms hereinafter described. The shaft 36, rotated in any well known manner, by the wheel 37, for instance, carries insulating sleeves 38, 39, which are fast thereon. Upon these sleeves are mounted, on each side, radiating contact arms 40, 41, 42 and 43, the last having preferably an extended contact surface 44, as shown in Fig. 8. The four radial contact arms are connected by wires in a well known manner to appropriate collector rings on the shaft 36, on the two sides of the machine. These rings are shown at 45, 46, 47, 48, 49, 50, 51 and 52, in Fig. 6. The arms revolve with their supporting shaft 36 in the direction indicated by the arrows in Figs. 7 and 8; that is to say with the arm 40 in front.

The connections are such as to carry out my process or method, as follows: Considering the action of any single coherer in the series or group, when the arms 40 make contact on the two sides, the coherer is brought into circuit through the rings 45 and 52 with the antenna 11 and ground 12, thus producing the conditions of Fig. 1. Contact is next made with the arms 41 on the two sides, and circuit is made and broken through the rings 46 and 51, the battery 26 and the induction coil 28, just as resulted in the position 18 of Fig. 6. The arms 42, connected with the rings 47 and 50, repeat this condition, as was the case in the position 19 in Fig. 5. The extended contact 44 on the arm 43, next closes circuit through the coherer, the rings 48 and 49, the battery 32, and the relay 16, all as in the position 20 in Fig. 5; and this condition is made to apply to two (or more) coherers simultaneously, as in Fig. 6, for the purposes heretofore explained. After each coherer has been submitted to this cycle of circuits, it becomes necessary to decohere it, and, for this purpose, many means may be supplied without departing from my invention. The means shown for this purpose in the drawings consist of a radial arm 53, fixed to the shaft 36, just within the cylindrically disposed series of revoluble coherers, which arm carries at its end an extended portion 54, to which is fixed at one end a yielding rubbing element 55, made of rubber, leather or like material. This element is so placed as to spring outward constantly to make successive rubbing contact with the successive coherers. By its friction and its tendency to cling to these coherers, the rubbing element 55 acts to give each coherer in turn a quick turn on its own axis, immediately after it leaves the relay contact 44. As above explained, this acts to decohere the coherer, and leave it ready for repeated operation when the series of switch arms return on the next cycle.

It will, of course, be understood that the drawings are not intended to represent the practical details of construction of actual machines, but merely to serve to convey a clear idea of means to the mind of one skilled in the art.

In order that possible sparks incidental to rupture of the developing circuits may not act in themselves to accidentally "impress" the detector for the time being in circuit with the antenna (and thereby produce false signals) I prefer to virtually surround either the area where sparks may be expected, or the antenna and ground conductors or both with iron or other metal to act as a shield.

In Fig. 5 I have shown the conductors leading from the antenna and to ground sheathed in a metal tubing 56, which will be found efficacious. On the other hand even a simple and relatively incomplete sheathing or inclosure of metal protecting the possible sparking area will serve to insure immunity from improper impressing of a coherer by its neighbor. In Fig. 9 I have shown a form of protective coherer mounting which may be used either with the form of machine shown in Fig. 5 or with that shown in Figs. 6, 7 and 8. Here the glass tube of the coherer is shown at 57 and the metal plugs at 58. These latter are preferably furnished with platinum points 59, and the whole is protected by a metal tube 60, from which it is insulated by a suitable layer 61. The tube 60 extends some distance beyond the two ends of the coherer, and within the extension at each end is a plunger 62, sliding within insulation 63, and provided with platinum points 64, adapted to close circuit through the coherer by contact with the points 59, when the plungers are pushed inward. These plungers are normally held out of contact by the springs 65. The outer end 66 of each plunger 62 projects out of the inclosing sleeve 60, and is rounded at its extremity, as shown. As each arm 40, 41, 42, 43 comes into contact with the cam-like rounded end 66 of each coherer in succession, it pushes in the plungers 62 and makes contact at 59, 64. It is at these platinum points that each circuit is made after contact with the revolving arms and broken before interruption of contact therewith. It follows that any spark that may occur takes place in the space under a plunger 62, and it is therefore entirely inclosed in metal. This shields any neighboring coherer from its influence.

Many changes may be made in the arrangement and construction of my machine, and in the modes of carrying out my process in embodying my discovery and without departing from the scope of my invention, and I do not limit myself to the details herein shown and described.

What I claim is:

1. The process of utilizing impulses of the character described in operating a recording means which consists in causing said impulses to impress a condition of incipient operativeness upon a suitable detector, subjecting said detector to a developing process to convert said incipient condition into a useful condition, and bringing the detector so developed into operative relation with said recording means, substantially as described.

2. The process of utilizing impulses of the character described in operating a recording means which consists in causing said impulses to impress a condition of incipient operativeness upon a suitable detector, subjecting said detector to a developing process to convert said incipient condition into a useful condition, bringing the detector so developed into operative relation with said recording means, and restoring said detector to a virgin condition in readiness for repitition of the process, substantially as described.

3. The process of utilizing impulses of the character described as produced in appropriate wave receiving means, such as the usual antenna, which consists in connecting a detector in circuit with said receiving means during occurrence of an impulse, then closing a developing circuit through said detector and, after discontinuing said developing circuit, closing a circuit through the detector and an appropriate recording means, substantially as described.

4. The process of utilizing impulses of the character described as produced in appropriate wave receiving means, such as the usual antenna, which consists in connecting a detector in circuit with said receiving means during occurrence of an impulse, then subjecting the detector to electrical surgings from a source independent of that which supplies said impulse to develop the original impression therein and then closing a circuit through the detector and an appropriate recording means, substantially as described.

5. The process of utilizing impulses of the character described as produced in appropriate wave receiving means, such as the usual antenna, which consists in connecting a detector in circuit with said receiving means during occurrence of an impulse, closing a developing circuit through said detector, then closing a circuit through said detector and an appropriate recording means, and finally restoring the detector to a virgin condition in readiness for a repetition of the process, substantially as described.

6. The process of utilizing impulses of the character described as produced in appropriate wave receiving means, such as the usual antenna, which consists in connecting a detector in circuit with said receiving means during occurrence of an impulse, successively closing and opening a new developing circuit through said detector, and then closing a circuit through the detector and an appropriate recording means, substantially as described.

7. The process of utilizing impulses of the character described as produced in appropriate wave receiving means, such as the usual antenna, which consists in connecting a detactor in circuit with said receiving means during occurrence of an impulse, disconnecting the said detector from said receiving means, developing the incipient condition so produced, while so disconnected closing a circuit through the detector so treated and an appropriate recording means, and finally restoring the detector to a virgin condition while on open circuit, substantially as described.

8. The process of utilizing impulses of the character described in operating a recording means, which consists in bringing individual members of a continuous series of detectors successively into operative relation with the source of such impulses, causing each of said detectors to pass thence into operative relation with a developing means and finally bringing each of said detectors after development into operative relation with an appropriate recording means, substantially as described.

9. The process of utilizing impulses of the character described in operating a recording means, which consists in bringing individual members of a continuous series of detectors successively into operative relation with the source of such impulses, removing each thence in turn and placing it in a developing circuit, and finally closing a circuit through each of said detectors in turn and through an appropriate electrical recording means, substantially as described.

10. The process of utilizing impulses of the character described in operating a recording means, which consists in bringing individual members of a continuous series of detectors successively into operative relation with the source of such impulses, removing each thence in turn and closing and opening through it one or more high induction circuits, and finally closing through each detector in turn a circuit including an appropriate electrical recording means, substantially as described.

11. The process of utilizing impulses of the character described in operating a recording means, which consists in bringing individual members of a continuous series of detectors successively into operative relation with the source of such impulses, removing each thence in turn and placing it in a developing circuit, closing a circuit through each of said detectors in turn and through an appropriate electrical recording means, and finally restoring each detector in turn to a virgin condition while on open circuit, substantially as described.

12. The method of utilizing a detector of impulses of the kind described in connection with a recording means which consists in subjecting the same to electrical surgings after it has been subjected to one of said impulses and before it is placed in operative relation with the recording means, substantially as described.

13. The method of utilizing a coherer which consists in first impressing the same by means of an impulse of the kind described, subjecting said coherer to surgings from an independent source to develop to useful coherence the incipient condition resulting from said impression, and then closing a circuit through the same and an electrical recording means, substantially as described.

14. The method of utilizing a coherer which consists in first impressing the same by means of an impulse of the kind described, subjecting the coherer to electrical surgings from an independent source to develop the impression so received to useful coherence, and then closing a recording circuit through the same, substantially as described.

15. The method of utilizing a coherer which consists in first impressing the same by means of an impulse of the kind described, delivered through a suitable circuit, removing the coherer from said circuit, developing to useful coherence the incipient condition resulting from said impression, and then closing a recording circuit through said coherer, substantially as described.

16. The method of utilizing a coherer which consists in first impressing the same by means of an impulse of the kind described, delivered through a suitable circuit, removing the coherer from said circuit, introducing the same into one or more circuits adapted to produce electrical surgings therein, and transferring the coherer to a recording circuit, substantially as described.

17. The method of utilizing a coherer which consists in first impressing the same by means of an impulse of the kind described, subjecting said coherer to surgings from an independent source to develop the impression so received to useful coherence, closing a recording circuit through the coherer, and finally decohering the same on open circuit, substantially as described.

18. The process of utilizing impulses of the character described in operating a recording means, which consists in bringing individual members of a continuous series of coherers successively into operative relation with the source of such impulses, removing each thence in turn and placing it in a developing circuit, closing a recording circuit through each of said coherers in turn, removing each coherer in turn from external circuits and while in this condition decohering the same, substantially as described.

19. The process of utilizing impulses of the character described in operating a recording means, which consists in bringing individual members of a continuous series of coherers successively into operative relation with the source of such impulses, removing each thence in turn and placing it in a developing circuit, closing a recording circuit through each of said coherers in turn, and finally decohering each in turn while on open circuit, substantially as described.

20. The method of utilizing a continuous series of detectors for the purpose of bringing a receiver of impulses of the character described into operative relation with an electrical recording device which consists in conveying them individually and successively through the spheres of influence of— first, a circuit from said receiver—second, one or more developing circuits and third, a recording circuit, substantially as described.

21. Apparatus for the purpose described comprising in combination a receiver of electrical impulses, a suitable detector, developing means, recording means, and means adapted to bring said detector into operative relation with said receiver, developing means and recording means successively, substantially as described.

22. Apparatus for the purpose described comprising in combination a receiver of electrical impulses, a suitable detector, one or more developing circuits, a recording circuit, and means for bringing said detector into electric connection with said receiver, said developing circuit or circuits and said recording circuit in succession, substantially as described.

23. Apparatus for the purpose described comprising in combination a receiver of electrical impulses, a suitable detector, one or more developing circuits, a recording circuit, and means for bringing said detector into electrical relation with said receiver, said developing circuit or circuits and said recording circuit successively and for restoring said detector to virgin condition after interrupting its connection with said recording circuit, substantially as described.

24. Apparatus for the purpose described comprising in combination a receiver of electrical impulses, a suitable detector, one or more high induction circuits, a recording circuit and means for closing said high induction and recording circuits through said detector after it has been placed in and removed from electric connection with said receiver, substantially as described.

25. Apparatus for the purpose described comprising in combination a series of detectors, a receiver of electrical impulses, a developing circuit, a recording circuit and means for bringing each of said detectors individually and successively into operative relation with said receiver, said developing circuit and said recording circuit in the order named, substantially as described.

26. Apparatus for the purpose described comprising a receiver circuit, a developing circuit and a recording circuit each circuit including stationary terminals, in combination with a series of detectors and means for conveying the same successively past said terminals and into and out of contact with each in turn, substantially as described.

27. Apparatus for the purpose described comprising a receiver circuit, a high inductance developing circuit, a series of detectors adapted to be brought individually into successive operative relation with said receiver and developing circuits, and a metal shield interposed between the point of rupture of said developing circuit and said receiver circuit, substantially as described.

28. Apparatus for the purpose described comprising a receiver circuit, a high inductance developing circuit, a series of detectors adapted to be brought individually into successive operative relation with said receiver and developing circuits, and a metal tube surrounding that portion of the receiver circuit into which said detectors are adapted to be led, substantially as described.

29. Apparatus for the purpose described comprising a circularly disposed series of detectors, a revoluble mounting therefor, and appropriate contact devices arranged to make successive circuit closing contacts with said detectors as they revolve past said contacts, substantially as described.

30. Apparatus for the purpose described comprising a circularly disposed series of coherers, revoluble disks supporting the ends of said coherers, and appropriate contact devices arranged to make successive circuit-closing contacts with said detectors as they revolve past said contacts, substantially as described.

31. Apparatus for the purpose mentioned comprising a receiver circuit, one or more developer circuits and a recording circuit, each of said circuits comprising a pair of suitably placed circuit-closing contacts; in combination with a series of circularly placed detectors and means for revolving the same between said contacts so as to introduce said detectors successively into each of said circuits in turn, substantially as described.

32. Apparatus for the purpose described comprising in combination a number of coherers, means for receiving and conveying the effect of atmospheric waves thereto, means independent of said first named means for developing the incipient influence of waves so conveyed, a final message-receiving circuit, and means for transferring the coherers from the influence of the developing means to said message-receiving circuit, substantially as described.

In testimony whereof, I affix my signature, in presence of two witnesses.

EDWIN R. GILL.

Witnesses:
H. S. MacKaye,
Katharine C. Mead.